United States Patent [19]

Chen et al.

[11] Patent Number: 5,296,568
[45] Date of Patent: Mar. 22, 1994

[54] ADDITION-CURED SILICONE ELASTOMERS AND COATED FUSING ROLLS USING SUCH ELASTOMERS

[75] Inventors: Tsang J. Chen, Rochester; Paul L. Nielsen, Lima, both of N.Y.

[73] Assignee: Eastman Kodak Company, Rochester, N.Y.

[21] Appl. No.: 891,321

[22] Filed: May 29, 1992

[51] Int. Cl.$^5$ .................. C08L 79/08; C08L 83/06; C08L 83/08
[52] U.S. Cl. ..................... 525/431; 528/31; 528/32; 528/28
[58] Field of Search .............. 525/431; 528/31, 32, 528/28

[56] References Cited

U.S. PATENT DOCUMENTS

| | | | |
|---|---|---|---|
| 2,823,218 | 2/1958 | Speier et al. | 528/15 |
| 2,970,150 | 1/1961 | Bailey | 260/348 |
| 4,030,948 | 6/1977 | Berger | 148/333 |
| 4,077,937 | 3/1978 | Sato et al. | 260/375 SB |
| 4,218,555 | 8/1980 | Antonoplos et al. | 528/126 |
| 4,258,146 | 3/1981 | Balanson et al. | 525/106 |
| 4,329,274 | 5/1982 | Falfynek | 524/862 |
| 4,336,364 | 6/1982 | Maxson | 528/15 |
| 4,387,046 | 6/1983 | Marsch et al. | 252/571 |
| 4,405,786 | 9/1983 | D'Alelio | 546/66 |
| 4,417,057 | 11/1983 | Lohmann et al. | 548/429 |
| 4,435,323 | 3/1984 | D'Alelio | 548/473 |
| 4,465,818 | 8/1984 | Shirahata et al. | 528/12 |
| 4,517,342 | 5/1985 | Ryang | 525/431 |
| 4,517,363 | 5/1985 | D'Alelio et al. | 546/66 |
| 4,528,349 | 7/1985 | D'Alelio | 526/262 |
| 4,533,575 | 8/1985 | Melancon | 427/387 |
| 4,595,739 | 6/1986 | Cavezzan | 528/15 |
| 4,624,888 | 11/1986 | St. Clair et al. | 428/262 |
| 4,656,050 | 4/1987 | Araps et al. | 427/12 |
| 4,659,621 | 4/1987 | Finn et al. | 428/339 |
| 4,719,130 | 1/1988 | Shimizu et al. | 427/380 |
| 4,767,826 | 8/1988 | Liang et al. | 525/421 |
| 4,807,341 | 2/1989 | Nielsen et al. | 29/132 |
| 4,818,614 | 4/1989 | Fukui et al. | 428/403 |
| 4,829,131 | 5/1989 | Lee | 525/426 |
| 4,830,893 | 5/1989 | Nakamura et al. | 428/35.8 |
| 4,839,452 | 6/1989 | Kurita et al. | 528/15 |
| 4,849,469 | 7/1989 | Crosby et al. | 524/439 |

FOREIGN PATENT DOCUMENTS

| | | |
|---|---|---|
| 878098 | 12/1979 | Belgium . |
| 12798 | 7/1980 | European Pat. Off. . |
| 133357 | 2/1985 | European Pat. Off. . |
| 210056 | 1/1987 | European Pat. Off. . |
| 284803 | 10/1988 | European Pat. Off. . |
| 321162 | 6/1989 | European Pat. Off. . |
| 131748 | 1/1971 | Netherlands . |

OTHER PUBLICATIONS

Chemical Abstracts 105:135021 abstracting Maudgal, S. et al.; Siloxane Containing Addition Polyimides II, Sampe Q, V16(1), Jun. 12, 1984 USA.

Primary Examiner—John C. Bleutge
Assistant Examiner—Margaret W. Glass
Attorney, Agent, or Firm—Willard G. Montgomery

[57] ABSTRACT

Toner fusing rolls with improved properties are formed with an outer layer comprising an addition-cured silicone elastomer. Such as elastomer is formed by crosslinking hydride substituted organopolysiloxanes and polyimides substituted with unsaturated hydrocarbon radicals.

12 Claims, No Drawings

ADDITION-CURED SILICONE ELASTOMERS AND COATED FUSING ROLLS USING SUCH ELASTOMERS

FIELD OF THE INVENTION

This invention relates to addition-cured silicone elastomers useful in rolls for fusing heat-softenable toner to a substrate in electrophotography processes.

BACKGROUND OF THE INVENTION

In electrophotographic copying processes, an electrostatic latent image is formed on a photoconductive surface and then developed with a thermoplastic toner powder. The toner is thereafter fused to a substrate by passing the substrate, (e.g., a sheet of paper on which toner powder is distributed in an imagewise pattern) through the nip of a pair of rolls. At least one of the rolls is heated and has a resilient surface so that the thermoplastic toner powder softens and bonds to the substrate.

A persistent problem in this operation is the adherence of heated toner to the fusing roll. As a result, a false offset image appears on sheets of paper subsequently passing through the rolls and performance of the fusing roll degrades. Upon continued heating, such roll degradation causes uneven surfaces and defective patterns in thermally fixed images.

Toner fusing rolls are composed of a cylindrical core which may contain a heat source in its interior and a resilient covering layer surrounding the core. A thin layer of a suitable primer is advantageously coated on the surface of the core in order to improve bonding to the covering layer. Roll coverings are commonly made of fluorocarbon polymers or silicone polymers, such as poly(dimethylsiloxane) polymers, which have a low surface energy to minimize toner adherence. Frequently, release oils (e.g., containing functionalized poly(dimethylsiloxanes)) are applied to the roll surface to prevent adherence of toner to the roll. However, such release oils can interact with the roll covering layer to cause eventual roll swelling, softening and degradation.

U.S. Pat. No. 4,807,341 discloses fusing rolls comprising a crosslinked elastomer prepared by copolymerization of dimethylsiloxane, diphenylsiloxane and vinylsiloxane monomers. Incorporation of 5–15 mole percent of diphenylsiloxane recurring units afforded improved resistance to swelling by release oils.

U.S. Pat. No. 4,659,621 discloses a roll for use in electrostatography with a surface layer comprising a crosslinked elastomer prepared by copolymerization of a polyfunctional silicone hydride, a vinyl polyorganosiloxane and a polyorganosiloxane filler. The roll afforded improved resistance to swelling by release oils.

Roll coverings usually contain a filler to strengthen the polymeric covering layer. A particularly useful filler is thermally conductive and provides thermal stability to the polymer layer. Such fillers are needed when fabricating fusing rolls with the commonly used poly(dimethylsiloxane) rubber polymers.

Fusing rolls with covering layers made of poly(dimethylsiloxane), despite their common use, have a number of deficiencies. There thus exists a need in the art for a polymeric covering layer which is thermally stable, resistant to chemical degradation, and thermally conductive.

SUMMARY OF THE INVENTION

The present invention relates to addition-cured silicone elastomers which are useful in fusing rolls. This elastomer imparts improved thermal stability, chemical stability, and thermal conductivity to fusing rolls.

This silicone elastomer is a crosslinked product of a hydride-substituted organopolysiloxane polymer and a polyimide substituted with aliphatic unsaturated hydrocarbon radicals. Crosslinking occurs between the hydride bearing silicon atoms of the organopolysiloxane and the unsaturated hydrocarbon radicals of the polyimide. In addition, the silicone elastomer can include an alkenyl-substituted organopolysiloxane which also undergo crosslinking with the hydride substituted organopolysiloxane.

The addition-cured silicone elastomer of the present invention is prepared from a mixture of the hydride-substituted organopolysiloxane, a polyimide substituted with aliphatic unsaturated hydrocarbon radicals, a Group VIII metal catalyst, and, optionally the alkenyl-substituted organopolysiloxane. A reaction then occurs under conditions suitable to crosslink the hydride bearing silicon atoms of the organopolysiloxane with the unsaturated hydrocarbon radicals of the polyimide and, optionally, the alkenyl groups of the alkenyl-substituted organopolysiloxane.

The silicone elastomers of the present invention are useful as outer covering layers for fusing rolls in electrophotographic equipment.

DETAILED DESCRIPTION OF THE INVENTION

The present invention relates to addition-cured silicone elastomers which are useful in fusing roll coverings. This elastomer is a crosslinked product of a hydride-substituted organopolysiloxane polymer, a polyimide substituted with aliphatic unsaturated hydrocarbon radicals, and, optionally, alkenyl-substituted organopolysiloxanes.

Preferably, the hydride substituted organopolysiloxane polymer has the formula:

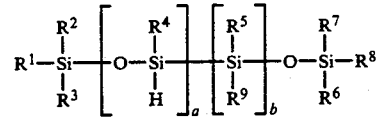

wherein,
$R^1$–$R^8$ are independently $C_{1-6}$ alkyl or phenyl;
$R^9$ is $C_{1-6}$ alkyl, phenyl, benzyl, cyano-substituted $C_{1-4}$ alkyl, $C_{1-4}$ fluoroalkyl or tri($C_{1-4}$ alkyl)silyloxy;
a is 3 to 3,000; and
b is 10 to 10,000.

Lower alkyl groups which $R^1$–$R^9$ may represent preferably include methyl, ethyl, propyl, isopropyl, butyl, sec-butyl, pentyl and hexyl. Cyano-substituted $C_{1-4}$ alkyl groups which $R^9$ represents preferably include 4-cyanobutyl, 3-cyanopropyl and 2-cyanoethyl. $C_{1-4}$ fluoroalkyl groups which $R^9$ represents preferably include, $CF_3$, —$(CH_2)_2CF_3$, —$(CH_2)_3$ and —$CF_2$—CHF—$CF_3$. Tri($C_{1-4}$ alkyl)silyloxy groups which $R^9$ represents preferably include trimethylsilyloxy. Hydride substituted organopolysiloxane polymers in which $R^1$–$R^9$ are methyl and the methyl hydride content is in the range of about 3 to 35 mole % are particularly preferred.

The hydride substituted organopolysiloxane polymers can be prepared by the copolymerization of the appropriate monomers using known polymerization catalysts as described, for example in Gilbert and Kantor, "Transient Catalysts for the Polymerization of Organosiloxanes," *J. Poly. Sci.* Vol. XL, pp. 35–58 (1959), which is hereby incorporated by reference.

Suitable monomers for the hydride-substituted organopolysiloxane polymers include any monomer which yields the desired substituted organosiloxane repeating units. These polymers should contain at least three hydride groups which are available for addition to the unsaturated functions of the other elastomer reactants. Particularly suitable monomers yield dimethylsiloxane or diphenylsiloxane repeating units. These include both linear and cyclic monomers containing dimethylsiloxane or diphenylsiloxane groups. A preferred monomer for providing the dimethyl siloxane units is octamethylcyclotetrasiloxane. A preferred monomer for providing the diphenylsiloxane units is octaphenylcylotetrasiloxane. Suitable monomers for providing the hydride units include dimethylsilylchloride, pentamethyldisiloxane, heptamethyltrisiloxane, hexamethylcylotetrasiloxane and 1,1,1,2,3,4,4,4-octamethyltetrasiloxane. Other monomer organosiloxane units (e.g., diethylsiloxane and other endcapping moieties such as those formed from hexamethyldisiloxane, decamethyltetrasiloxane, 1,3-diphenyltetramethyldisiloxane, and 1,1,5,5-tetraphenyl-1,3,3,5-tetramethyltrisiloxane) may be added in appropriate amounts. Organosiloxane monomers containing benzyl, cyanoalkyl, fluoroalkyl or alkylsilyloxy groups are known and also can be incorporated in the hydride-substituted organopolysiloxane polymers.

Suitable hydride substituted organopolysiloxanes are available from Hüls America Inc., Piscataway, N.J., which contain varying weight percentages of methylhydro groups (Wt %) and have different number-average molecular weights (Mn). Such siloxanes include, for example, the following types: methylhydro, dimethylsiloxane copolymer, trimethylsilyl terminated [Chemical Abstracts (CAS) Registry No. 68037-59-2], e.g. Wt %, Mn; 50–55%, 900–1,000; 30–35%, 2,000–2,100; 0.5–1%, 10,000; and 3–4%, 13,000; methylhydro, cyanopropylmethyl siloxane copolymer, e.g. Wt % 3–4, Mn 16,000; and methylhydro, phenylmethyl siloxane copolymer, dimethylsiloxy terminated, e.g. Wt % 45–50, Mn 1000–1200.

The polyimides useful in the addition-cured silicone elastomers of the present invention are terminally substituted by aliphatic unsaturated hydrocarbon radicals. Particularly useful polyimides are low molecular weight aromatic based polyimide oligomers endcapped with ethynyl or vinyl groups according to the following formula:

$$R^{12}-R^{10}-(Ar-R^{11})_p-R^{13}$$

wherein,
Ar is naphthyl or

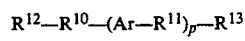

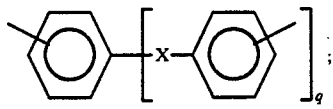

X is $CH_2$, O, S, SO, $SO_2$, CO or a bridging bond;
p is 1–4;
q is 0–3;
$R^{10}$ and $R^{11}$ independently represent a diradical of the formula:

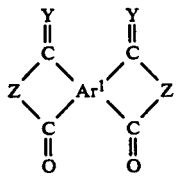

wherein,
$Ar^1$ has the structure:

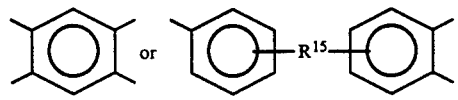

wherein,
$R^{15}$ is O, S, CO, SO or $C(CF_3)_2$;
Y and Z are independently O or N— provided that when one of Y or Z is O then the other is N—;
$R^{12}$ and $R^{13}$ are independently $R^{14}$—$Ar^2$ and $R^{12}$ and $R^{13}$ can be the same or different;
$R^{14}$ is ethynyl or vinyl;
$Ar^2$ is phenyl, naphthyl or

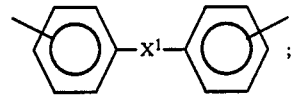

and
$X^1$ is O, S, or $C(CF_3)_2$.

In this polyimide, aryl radicals which Ar represents preferably include 1,3 and 1,4-phenylene, 1,7-naphthylene, 4,4'-methylenediphenyl, 4,4'-oxydiphenyl, 1,3-phenylenebis(3-oxyphenyl), and 1,1'-biphenylene. Aryl radicals which $Ar^1$ preferably represents preferably include benzophenone-3,3',4,4'-tetrayl, 2,2-diphenylhexafluoropropane-3',3''',4',4''-tetrayl, diphenylether-3,3',4,4'-tetrayl, diphenysulfide-3,3',4,4'-tetrayl, and benzene-1,2,4,5-tetrayl. Aryl radicals which $Ar^2$ represents preferably include 1,3-phenylene, 1,4-phenylene, and 1,5-naphthylene. Preferred polyimides are those in which X is O, p is 1, q is 2, $R^{15}$ is CO or $C(CF_3)_2$, $Ar^2$ is phenyl, or $R^{14}$ is ethynyl.

The unsaturated polyimides useful in the elastomers of the present invention are generally of low molecular weight and are either commercially available or may be prepared by methods well known in the prior art. The term polyimide includes polyimides and the corresponding isoimides and mixtures thereof. One such polyimide is available under the trade name THERMID FA-7001 (polyimide) from the National Starch and Chemical Corp., Bridgewater, N.J.

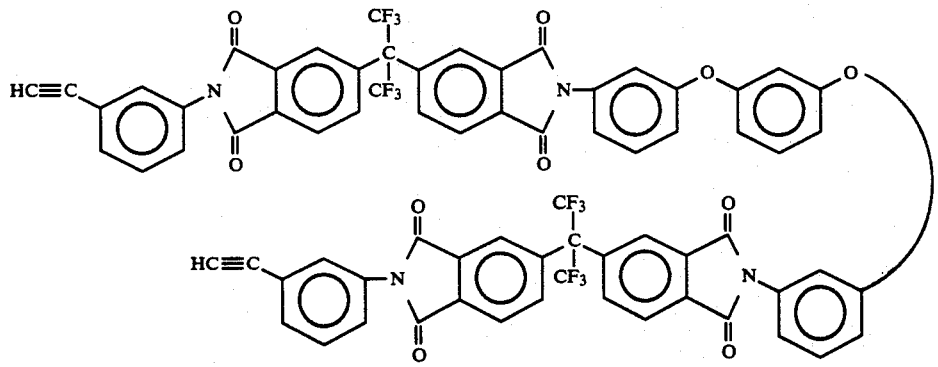

Another suitable polyimide is THERMID (IP-6001) (polyisoimide) which is also available from National Starch and Chemical Corp.

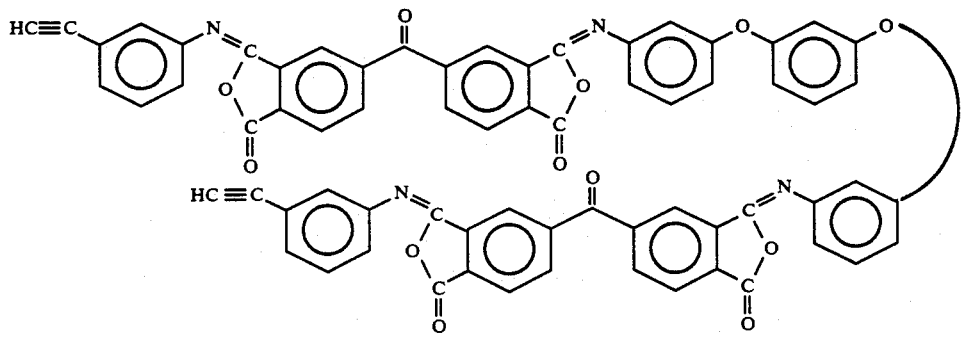

Other suitable polyimides and their methods of preparation are disclosed in U.S. Pat. Nos. 4,218,555; 4,517,363; and 4,624,888, the disclosures of which are hereby incorporated by reference.

As noted above, addition-cured silicone elastomers may optionally also include a lower alkenyl substituted organopolysiloxane. This additive's alkenyl groups also crosslink with the hydride group of the hydride-substituted organopolysiloxane. Preferably, the lower alkenyl substituted organpolysiloxane has the following formula:

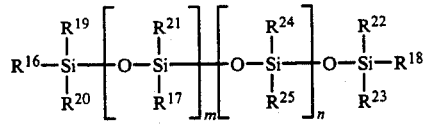

wherein,
m is 10 to 10,000;
n is 1 to 1,000;
$R^{16}$, $R^{17}$, and $R^{18}$ are independently $C_{1-6}$ alkyl, $C_{2-5}$ alkenyl or phenyl provided at least two of $R^{16}$, $R^{17}$ and $R^{18}$ are $C_{2-5}$ alkenyl;
$R^{19}$–$R^{24}$ are independently $C_{1-6}$ alkyl or phenyl; and
$R^{25}$ is $C_{1-6}$ alkyl, phenyl, benzyl, cyano-substituted $C_{1-4}$ alkyl, $C_{1-4}$ fluoroalkyl or tri($C_{1-4}$ alkyl)silyloxy.

In the alkenyl substituted organopolysiloxane, alkyl groups which $R^{16}$–$R^{25}$ may represent preferably include methyl, ethyl, propyl, isopropyl, butyl, sec-butyl, pentyl or hexyl groups. Alkenyl groups which $R^{16}$–$R^{18}$ may represent preferably include vinyl, 1-propenyl, 2-methyl-1-propenyl, 1,2-dimethyl-1-propenyl and 1-butenyl groups. Cyano-substituted $C_{1-4}$ alkyl groups which $R^{25}$ represents preferably includes 4-cyanobutyl, 3-cyanopropyl and 2-cyanoethyl. $C_{1-4}$ fluoroalkyl groups which $R^{25}$ represents preferably includes $CF_3$, —$(CH_2)_3CF_3$ and —$CF_2$—$CHF$—$CF_3$. Tri($C_{1-4}$ alkyl)silyloxy groups which $R^{25}$ represents preferably includes trimethylsilyloxy. Preferred alkenyl substituted organopolysiloxanes are those in which $R^{16}$ and $R^{18}$ are vinyl and $R^{17}$ and $R^{19}$–$R^{25}$ are methyl.

The lower alkenyl substituted organopolysiloxanes may be prepared using the methods described by Gilbert et al., supra. Especially useful monomers for the preparation of such polymers include 1,3-divinyltetramethyldisiloxane, 1,3,5,7-tetramethyl-1,3,5,7-tetravinylcyclotetrasiloxane, 1,3-divinyl-1,3-diphenyl-1,3-dimethyldisiloxane, and 1,3-divinyltetraphenyldisiloxane.

Suitable vinyl substituted organopolysiloxane polymers are available from Hüls America Inc., which contain varying weight percentages of vinyl groups (Wt %). Such siloxanes include, for example, the following types: vinyldimethyl terminated polydimethylsiloxanes (CAS Registry No. 68951-99-5), e.g. Wt % 12–14 and 0.18–0.26; vinylmethyl, dimethylsiloxane copolymer, trimethylsiloxy terminated (CAS Registry No. 67762-94-1), e.g. Wt % 1.0 and 7.5; vinylmethyl, dimethylsiloxane copolymer, vinyldimethyl terminated; and vinylphenylmethyl terminated dimethyl siloxanes. Also available from Hüls America Inc. are diphenyl, dimethyl siloxane copolymer, vinyl terminated polymers (CAS Registry No. 689051-96-2) containing different amounts (mole percent) of dimethylsiloxane and diphenylsiloxane units, e.g. dimethylsiloxane (97%), diphenylsiloxane (3%), Mn 15,600; and dimethylsiloxane (84%), diphenylsiloxane (6%), Mn 9,300.

To prepare the addition-cured silicone elastomer of the present invention the hydride-substituted organopolysiloxane, the polyimide, and, optionally, the lower alkenyl substituted organopolysiloxane are mixed with a suitable inert solvent. Suitable solvents are tetrahydrofuran, toluene, diglyme, dimethylformamide, and N-methyl pyrrolidinone. In cases where the polymers are liquid, a solvent is not necessary.

Crosslinking is promoted by the addition of a suitable catalyst. Suitable catalysts are those which promote addition-curing, such as Group VIII metals or derivatives thereof. Examples of such catalysts in a metallic state are platinum, ruthenium, rhodium, palladium, and iridium. Also useful are compounds or complexes of these metals, such as $PtCl_4$, $PtCl_6 \cdot 6H_2O$, $Na_2PtCl_4 \cdot 4H_2O$, platinum-olefin complexes, platinum-alcohol complexes, platinum-ether complexes, platinum-aldehyde complexes, platinum-ketone complexes (e.g., the reaction product of $PtCl_6 \cdot 6H_2O$ and cyclohexanone), platinum-vinylsiloxane complexes (e.g., platinum-divinyl-tetramethyldisiloxane complex), palladium triphenylphosphine, and rhodium triphenylphosphonium chloride. Such catalysts are preferably used in amounts of from 0.5 to 500 ppm (parts per million, by weight), calculated as the metallic element and based on the weight of the reactants.

In forming the mixture of the addition-cured silicone of the present invention, the mixture of the hydride-substituted organopolysiloxane, the polyimide, the catalyst, and, optionally, the lower alkenyl substituted organopolysiloxane and the solvent is subjected to a temperature of from 15° C. to 100° C., preferably 15° C. to 30° C. until an elastomer having a number-average molecular weight from about 1,000 to 1,000,000, preferably from 10,000 to 500,000, is obtained. To achieve this degree of polymerization, it is usually desirable to maintain the mixture at the above temperature range for a period of 1–24 hours, preferably 1 to 3 hours. The elastomers are isolated from the mixture by drying to remove the solvent.

Preferred elastomers of the invention are those prepared by addition-curing of a reactant mixture comprising from about 25–70 mole percent of a hydride-substituted organopolysiloxane, 20–50 mole percent of a polyimide, and 0–40 mole percent of a lower alkenyl substituted organopolysiloxane. When present, the lower alkenyl substituted organopolysiloxane comprises at least 5 mole percent of the mixture.

When used in fusing rolls, the elastomer of the present invention can be formed by applying the reactant mixture and any other addenda, such as fillers and release agents, to the outer surface of a cylindrical core. The fusing roll core can be formed from any rigid metal or plastic substance. Suitable core materials include aluminum, steel, and various alloys. Also useful are polymeric materials, such as thermoset resins, with or without fiber reinforcement.

A variety of fillers can be incorporated in the covering layer. Reinforcing fillers, such as carbon, silica, and calcium carbonate can be used to improve the physical or thermal properties of the covering layer.

Metals, metal alloys, metal salts, or metal oxides can be used to improve the thermal conductivity of the covering layers. Silicon carbide and boron nitride can also be used as conductive fillers. Examples of metal oxides which can be incorporated without adverse effect include aluminum oxide (i.e. alumina), zinc oxide, titanium oxide, and ferric oxide. A concentration from about to 30 to 75 weight percent of alumina in the covering can be used to improve the thermal conductivity and thermal stability of the covering. Ferric oxide in amounts from about 1 to 10 weight percent serves as a thermal stabilizer for the polymer. Inorganic fillers like alumina and ferric oxide also strengthen the polymer so that other reinforcing fillers such as silica and calcium carbonate can be eliminated or used in lower concentrations.

A fusing roll in accordance with the present invention can also contain a release agent to reduce the adhesion of toner to the roll covering. Such agent can be blended with the base polymer in minor concentrations, e.g., 5 to 25 weight percent of the covering layer. Examples of release agents include poly(tetrafluoroethylene), polydimethylsiloxanes, boron nitride, and fluorinated graphite.

The fusing roll is fabricated by first preparing a mixture to be used to form the covering. The mixture includes a hydride-substituted organopolysiloxane, a polyimide, optionally an alkenyl substituted siloxane polymer, other addenda, such as fillers and release agents, and a catalyst. The ingredients of the mixture are blended together by any convenient means, for example, by milling all the ingredients together on a two-roll mill. In a preferred embodiment, the mixture comprises from about 10–30 weight percent of the hydride substituted organopolysiloxane, 1–5 weight percent of the polyimide, 5–15 weight percent of the alkenyl substituted organopolysiloxane, 50–75 weight percent of a filler and about 10 parts per million of a platinum catalyst.

A covering of the mixture in the form of a 0.5 to 2 mm thick sheet is placed on the cylindrical core and molded thereto by conventional means. For example, the sheet can be compression molded with heat and pressure to cause at least some addition-curing of the polymer. Preferably, molding is carried out at a temperature of 160°–180° C. for about six hours. After molding, the covered roll is cooled, removed from the molding apparatus, and subjected to further heating to complete curing and to drive volatile materials out of the covering. The post-molding heat treatment is preferably carried out at temperatures above 200° C. for up to about 24 hours. If desired, the covered roll can then be ground down to desired diameter by any known technique.

Rolls produced in accordance with the present invention exhibit good fusing performance and durability over long copy runs. Their superior resistance to swelling by release oils results in a reduction or elimination of step patterns. Such fusing rolls have excellent thermal degradation resistance and satisfactory thermal conductivity, hardness, resilience, compressibility, and tensile strength.

Fusing rolls produced in accordance with the present invention are useful in electrophotographic copying machines to fuse heat-softenable toner to a substrate. This can be accomplished by contacting a receiver, such as a sheet of paper, to which toner particles are electrostatically attracted in an imagewise fashion with such a fusing roll. Such contact is maintained at a temperature and pressure sufficient to fuse the toner to the receiver.

The following examples are included to illustrate the preparation of silicone elastomers and the preparation and properties of compositions for use in fusing heat-softenable toner to a substrate. Parts and percentages are by weight unless otherwise specified.

EXAMPLES

EXAMPLE 1

Three parts of PS123, a methylhydro dimethylsiloxane copolymer (30–35% methylhydro, Mn 2000–2100, sold by Hüls America Inc., Piscataway, N.J.), and 1.25 parts of Thermid IP-6001, an ethynyl-terminated polyisoimide precursor (Mn 1099, Tg: 300° C. were dissolved in 20 parts of tetrahydrofuran at room temperature. A catalytic amount of PC075, a platinum-divinyltetramethylsiloxane complex (3–3.5% platinum concentration in vinyl terminated polydimethylsiloxane, sold by Hüls America Inc.) was added to the solution, and stirred at ambient conditions. Within less than 60 minutes, the solution gelled, indicating the formation of a crosslinked network. The gels, after drying at 60° C., had a Tg of 142° C.

EXAMPLE 2

Three parts of PS123, 1.25 parts of IP-6001, and 20 parts of tetrahydrofuran were mixed to form a uniform solution. Then, 15 parts of PS442 (a vinyldimethyl terminated polydimethylsiloxane (viscosity, 500 ctsk, Mn 17250, sold by Hüls America Inc.) were added and mixed thoroughly. A catalytic amount of PC075 was then added and the mixture was kept at ambient conditions. A solid gel was formed in less than three hours, a typical sign of network formation. The gel had a Tg of −117.7° C. and Tm of −55.3° C.

EXAMPLE 3

Samples, as shown in Table 1, were milled using Alcoa T61 (an alumina filler sold by Alcoa) as thermally conductive filler, PS124.5 (methylhydro dimethylsiloxane copolymer with 3–4 mole % methylhydro groups, Mn 13,300, from Hüls America Inc.), and PS442 (vinyldimethyl terminated polydimethylsiloxane, Mn 17250 from Hüls America Inc.), with and without IP6001 (ethynyl-terminated polyisoimide, Mn 1099 from National Starch and Chemical Corp.).

TABLE 1

| Sample | PS124.5(g) | PS442(g) | IP-6001(g) | Alcoa T61(g) |
|---|---|---|---|---|
| 3-1 | 120.0 | 40.0 | 0 | 440.7 |
| 3-2 | 60.0 | 20.0 | 4.2 | 220.35 |
| 3-3 | 120.0 | 40.0 | 0 | 440.7 |
| 3-4 | 60.0 | 20.0 | 4.2 | 220.35 |
| 3-5 | 120.0 | 40.0 | 0 | 440.7 |
| 3-6 | 60.0 | 20.0 | 4.2 | 220.35 |

Using three different levels of catalyst, curing was carried out by heating the samples to 160° C., and holding at 160° C. for 120 min., then heating to 170° C. and holding at 170° C. for 180 min., then heating to 180° C. and holding at 180° C. for 60 min. The rate of heating/cooling was 5° C./min., in open air. The temperature at which 5% weight loss occurred (T-1) and the temperature at which onset of degradation was observed (T-2), were determined (Table 2). The results show that incorporation of IR-6001 improved the thermal stability of addition-cured silicone elastomers.

TABLE 2

| Sample # | % Pt Used | T-1 (°C.) | T-2 (°C.) |
|---|---|---|---|
| 3-1 | 0.001 | 333 | 309 |
| 3-2 | 0.001 | 385 | 372 |
| 3-3 | 0.0005 | 365 | 329 |
| 3-4 | 0.0005 | 384 | 369 |
| 3-5 | 0.002 | 341 | 315 |
| 3-6 | 0.002 | 384 | 368 |

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. An addition-cured silicone elastomer comprising:
   about 10 to 30 weight percent of a hydride-substituted organopolysiloxane polymer containing at least three hydride groups;
   about 5 to 15 weight percent of a lower alkenyl-substituted organopolysiloxane polymer;
   about 1 to 5 weight percent of a polyimide substituted with terminal aliphatic unsaturated hydrocarbon radicals; and
   about 50 to 75 weight percent of a filler; wherein crosslinking is present between the hydride-bearing silicon atoms of said hydride-substituted organopolysiloxane and the unsaturated hydrocarbon radicals of said alkenyl-substituted organopolysiloxane polymer or said polyimide, said elastomer having a number-average molecular weight of 1,000 to 1,000,000, and wherein said polyimide has the formula:

wherein,
Ar is naphthyl or

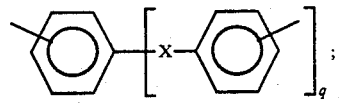

X is $CH_2$, O, S, SO, $SO_2$, CO, or a bridging bond;
p is 1–4;
q is 0–3;
$R^{10}$ and $R^{11}$ independently represent a diradical of the formula:

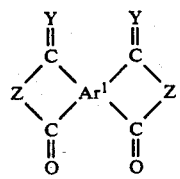

wherein,
$Ar^1$ has the structure:

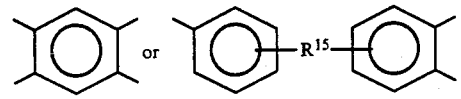

wherein,
$R^{15}$ is O, S, CO, SO, or $C(CF_3)_2$;
Y and Z are independently O or N— provided that when one of Y or Z is O the other is N—;

$R^{12}$ and $R^{13}$ are independently $R^{14}$—$Ar^2$, and $R^{12}$ and $R^{13}$ can be the same or different;

$R^{14}$ is ethynyl or vinyl;

$Ar^2$ is phenyl, naphthyl, or

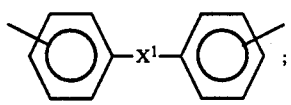

and $X^1$ is O, S or $C(CF_3)_2$.

2. An elastomer according to claim 1, in which the alkenyl substituted organopolysiloxane has the formula:

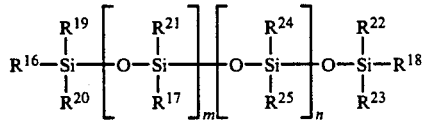

wherein, m is 10 to 10,000;

n is 1 to 1,000;

$R^{16}$, $R^{17}$, and $R^{18}$ are independently $C_{1-6}$ alkyl, $C_{2-5}$ alkenyl or phenyl, provided at least two of $R^{16}$-$R^{18}$ are $C_{2-5}$ alkenyl;

$R^{19}$-$R^{24}$ are independently $C_{1-6}$ alkyl or phenyl; and $R^{25}$ is $C_{1-6}$ alkyl, phenyl, benzyl, cyano-substituted $C_{1-4}$ alkyl, $C_{1-4}$ fluroalkyl or tri($C_{1-4}$ alkyl)silyloxy.

3. An elastomer according to claim 1, wherein said elastomer contains 25 to 70 mole percent of said hydride-substituted organopolysiloxane, 5 to 40 mole percent of said lower alkenyl substituted organopolysiloxane, and 20 to 50 mole percent of said polyimide.

4. An elastomer according to claim 3, wherein said hydride-substituted organopolysiloxane is a methylhydro dimethylsiloxane copolymer having 3–4 mole % methylhydro groups and a number-average molecular weight of about 13,300, said lower alkenyl substituted organopolysiloxane is a vinyldimethyl-terminated polydimethylsiloxane having a number-average molecular weight of about 17,250, and said polyimide is selected from the group consisting of

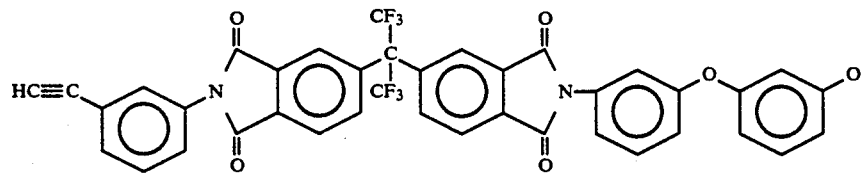

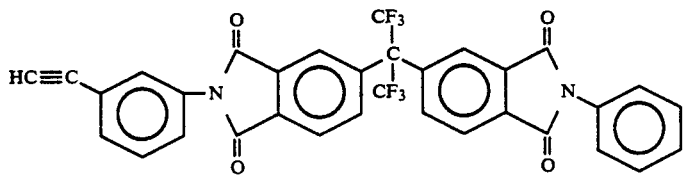

and

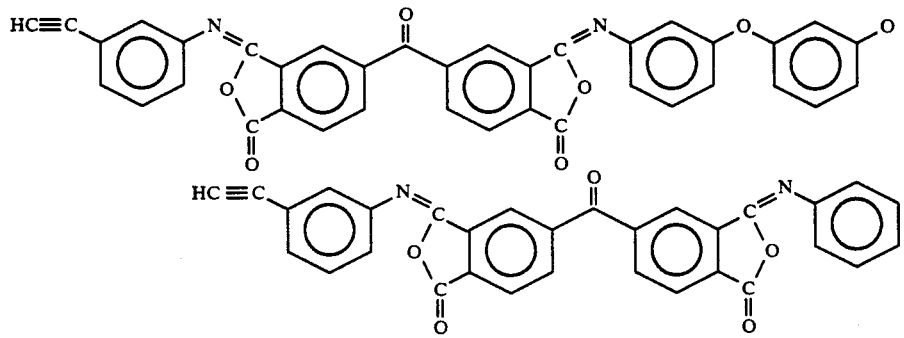

5. An elastomer according to claim 1, in which said hydride-substituted organopolysiloxane has the formula

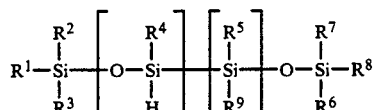

wherein, $R^1$-$R^8$ are independently $C_{1-6}$ alkyl or phenyl;

$R^9$ is $C_{1-6}$ alkyl, phenyl, benzyl, cyano-substituted $C_{1-4}$ alkyl, $C_{1-4}$ fluoroalkyl, or tri($C_{1-4}$ alkyl)-silyloxy;

a is 3 to 3,000; and b is 10 to 10,000.

6. An elastomer according to claim 1 wherein p is 1, q is 2, and X is O.

7. An elastomer according to claim 1, wherein said filler is thermally conductive.

8. A process for preparing an addition-cured silicone elastomer comprising the steps of:

forming a mixture comprising about 10 to 30 weight percent of a hydride-substituted organopolysiloxane polymer containing at least three hydride groups, about 5 to 15 weight percent of a lower alkenyl-substituted organopolysiloxane polymer, about 1 to 5 weight percent of a polyimide substituted with terminal aliphatic unsaturated hydrocarbon radicals, about 50 to 75 weight percent of a filler, and a Group VIII metal catalyst; and reacting said mixture under conditions suitable to crosslink the hydride-bearing silicon atoms of said organopolysiloxane with the unsaturated hydrocarbon radicals of said alkenyl-substituted organopolysiloxane polymer or said polyimide, wherein said polyimide has the formula:

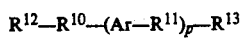

wherein,
Ar is naphthyl or

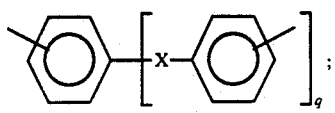

X is $CH_2$, O, S, SO, $SO_2$, CO, or a bridging bond;
p is 1–4;
q is 0–3;
$R^{10}$ and $R^{11}$ independently represent a diradical of the formula:

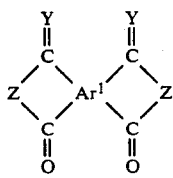

wherein,
$Ar^1$ has the structure:

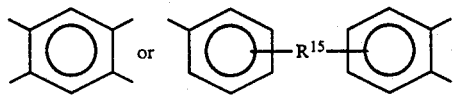

wherein,
$R^{15}$ is O, S, CO, SO, or $C(CF_3)_2$;
Y and Z are independently O or N— provided that when one of Y or Z is O the other is N—;
$R^{12}$ and $R^{13}$ are independently $R^{14}$—$Ar^2$, and $R^{12}$ and $R^{13}$ can be the same or different;

$R^{14}$ is ethynyl or vinyl;
$Ar^2$ is phenyl, naphthyl, or

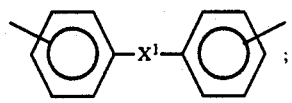

and
$X^1$ is O, S or $C(CF_3)_2$.

9. A process according to claim 8, wherein the lower alkenyl substituted organopolysiloxane has the formula:

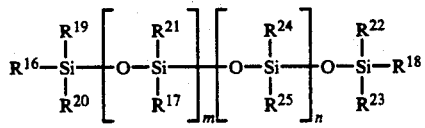

wherein,
m is 10 to 10,000;
n is 1 to 1,000;
$R^{16}$, $R^{17}$ and $R^{18}$ are independently $C_{1-6}$ alkyl, $C_{2-5}$ alkenyl or phenyl, provided at least two of $R^{16}$–$R^{18}$ are $C_{2-5}$ alkenyl;
$R^{19}$–$R^{24}$ are independently $C_{1-6}$ alkyl or phenyl; and
$R^{25}$ is $C_{1-6}$ alkyl, phenyl, benzyl, cyano-substituted $C_{1-4}$ alkyl, $C_{1-4}$ fluoroalkyl or tri($C_{1-4}$ alkyl)-silyloxy.

10. A process according to claim 8 wherein said hydride-substituted organopolysiloxane has the formula:

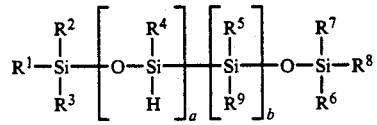

wherein,
$R^1$–$R^8$ are independently $C_{1-6}$ alkyl or phenyl;
$R^9$ is $C_{1-6}$ alkyl, phenyl, benzyl, cyano-substituted $C_{1-4}$ alkyl, $C_{1-4}$ fluoroalkyl, or tri($C_{1-4}$ alkyl)-silyloxy;
a is 3 to 3,000; and
b is 10 to 10,000.

11. A process according to claim 8, wherein said filler is thermally conductive.

12. A process according to claim 8 wherein the reacting is carried out at 15° to 30° C.

* * * * *